United States Patent Office 2,739,161
Patented Mar. 20, 1956

2,739,161

BIS-EPOXYCYCLOPENTANYL ETHER

Arthur W. Carlson, Chicago, Ill., assignor to Velsicol Chemical Corporation, a corporation of Illinois No Drawing. Application December 16, 1954, Serial No. 475,841

1 Claim. (Cl. 260—348)

This invention relates to new epoxide-ether compositions of matter. More specifically, this invention relates to the diepoxide of bis-cyclopentenyl ether and to resin compositions derived therefrom. The diepoxide of bis-cyclopentenyl ether may be illustrated by the structure

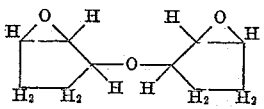

The composition of the present invention is a colorless mobile liquid having a sweet pleasant odor and boiling at elevated temperatures.

By virtue of these physical properties and the epoxide groups therein contained, the present product has utility in the preservation of essential oils and perfumes against degradation by light, heat and air.

Ordinarily, perfumes contain in addition to the odorant factor, certain essential oils which in themselves contribute to the perfume and natural products which regulate evaporation and provide the linger associated with better perfumes. Since in many cases these ingredients are unsaturated materials, they have a tendency to become rancid when exposed to body heat and air. To counteract this property, it has been necessary to add certain stabilizers to the perfume formulation. The present composition is especially useful in this respect as it provides a stabilizing action and concomitantly contributes to the fragrance of the formulation. This property is seen most advantageously when incorporatd into proprietary toiletry goods such as soaps, creams, skin lotions, hair dressings and cosmetics of a broad variety which contain such unsaturated materials.

These compounds are further useful as stabilizers for resins in general and are particularly valuable as stabilizers for resins containing chlorine such as polyvinyl chloride, neoprene, vinylidene chloride, chlorendic acid polyesters, and the like, and also for chlorine containing insecticides such as endrin, dieldrin and the like.

Aside from stabilizer properties which are inherent in the products of the present invention, they are reactive organic epoxides which upon treatment with certain ionic catalysts form polyether resins. These polyether resins can be formed from bis-cyclopentenyl ether diepoxide alone or can be prepared with other epoxy materials to form a copolymeric polyether resin which has the desirable properties imparted by the products of the present invention. Epoxides which are useful in compounding these copolymeric polyethers are styrene oxides, propylene oxide, butylene oxide, vinyl cyclo hexene oxide, allyl glycidyl ether, dicyclopentadiene epoxide and the like. The acidic catalysts suitable for catalyzing this reaction are $BF_3$, $AlCl_3$, $SnCl_4$, $ZnCl_2$, $H_3PO_4$, and the like.

The starting material for the present composition, bis-cyclopentenyl ether, is prepared initially from cyclopentadiene. The mode of preparation is disclosed in my copending United States patent application, Serial No. 352,040, filed April 29, 1953. The process substantially involves addition of HCl to cyclopentadiene to produce 3-chlorocyclopentene which is hydrolyzed with weak aqueous alkali to produce the corresponding hydroxy compound. The alcohol readily forms the ether by acid catalysis in high yield and is recovered by vacuum distillation.

The epoxidation of bis-cyclopentenyl ether is accomplished by the use of an organic per acid reagent such as peracetic acid, perbenzoic acid, or monoperphthalic acid. Generally, a slight molar excess of the peracid reagent is desirable and about a 50% molar excess is preferred. The temperature of peroxidation should be below about 65° C. and preferably from about 10° C. to about 25° C. Pressure is not a critical factor in the present invention and atmospheric pressures can be used or pressures either slightly above or below atmospheric pressure are suitable.

The following examples will illustrate the method of preparing the starting material and final product.

EXAMPLE I

A. *Preparation of 3-chlorocyclopentene*

Into a ½ liter, 3-necked flask equipped with a stirrer, gas inlet sparger and reflux condenser, was placed cyclopentadiene (132 grams; 2 moles). While maintaining the cyclopentadiene at a temperature of about −20° C., gaseous HCl was continuously introduced into the flask below the liquid surface at a rate sufficient to maintain a saturated solution of HCl in cyclopentadiene. The reaction is exothermic and the temperature was maintained below about −15° C. The addition of HCl was discontinued after about two hours and the desired 3-chlorocyclopentene was recovered by fractional distillation in vacuo. The 3-chlorocyclopentene boiled at 25° C. and 30 mm. Hg pressure. The yield of product was about 80% based on cyclopentadiene utilized.

B. *Preparation of 3-hydroxycyclopentene*

A solution of potassium carbonate (694 grams; 5 moles) in water (1000 ml.) was introduced into a dropping funnel. 3-chlorocyclopentene (513 grams; 5 moles) was likewise introduced into a different dropping funnel and maintained at a temperature of about −50° C. The contents of the two separatory funnels were simultaneously and continuously introduced at a constant rate into a reaction vessel containing water maintained at 5 to 10° C. The rate of introduction of the two reactants was such as to require about 1.5 hours to empty the two dropping funnels. During addition of the reactants to the reaction vessel, the reaction mixture was constantly and vigorously stirred and maintained at a temperature of about 5 to 10° C. When the reactants had been completely added to the reaction vessel, stirring of the mixture was continued and the temperature was slowly increased to normal room temperature. The reaction mixture was then filtered to remove undissolved material and the organic layer of the filtrate was separated from the aqueous layer. The aqueous fraction was extracted several times with small portions of diethyl ether and the extracts were combined with the organic fraction. This combined organic material was then washed several times with a saturated solution of sodium chloride in water and was then dried successively over anhydrous sodium sulfate and potassium carbonate. The ether solvent was removed by distillation in vacuo and the residue was further fractionated by distillation in vacuo to recover 3-hydroxycyclopentene as the principal product. It boils at 46 to 50° C. at 9–10 mm. Hg pressure.

In part B of the present example is shown the preparation and isolation of 3-hydroxycyclopentene. 3-hydroxycyclopentene can be etherified to form bis-(2-cyclopentenyl) ether by treatment with a mineral acid catalyst. Bis-(2-cyclopentenyl) ether can also be prepared from 3-chlorocyclopentene in one step without isolating the intermediate hydroxy compound as is shown in part C immediately hereafter.

C. Preparation of bis-(2-cyclopentenyl) ether

The process stated in part B was duplicated in every detail to the point where the reactants had been completely added to the reaction vessel. The reaction mixture was then stirred for an additional two hours without external cooling. The reaction mixture was then neutralized with concentrated hydrochloric acid and 10 ml. excess concentrated hydrochloric acid was then added thereto. Stirring was continued for about 2.5 hours at room temperature and then the mixture was permitted to stand about 16 hours. The organic layer of the reaction mixture was removed from the aqueous layer and washed thoroughly with water. The washed organic fraction was dried over anhydroux potassium carbonate and then fractionally distilled in vacuo. Bis-(2-cyclopentenyl) ether was recovered as a colorless liquid boiling at 64–65° C. under 9 mm. Hg pressure. The following analysis was obtained for this desired intermediate:

|  | C, percent | H, percent |
|---|---|---|
| Calculated for $C_{10}H_{14}O$ | 79.95 | 9.39 |
| Found for Product | 79.72 | 9.41 |

EXAMPLE II

*Preparation of bis-cyclopentenyl ether diepoxide*

Dicyclopentenyl ether (2.0 mol. 300.4 g.) was placed in a three-necked flask equipped with a stirrer, reflux condenser, thermometer, and separatory funnel. Peracetic acid 40% (4.4 mol. 836 g.) previously treated with sodium acetate (14 g.) was introduced dropwise for 2.5 hours. The temperature during the above addition and throughout the entire reaction was maintained at 15–20° C. After addition was complete the reaction mixture was stirred for an additional five hours, and the contents of the flask were then neutralized with KOH. The contents of the flask were extracted with ether several times and the combined extracts dried over anhydrous $K_2CO_3$. The ether solvent was removed by evaporation and the liquid residue was subjected to careful vacuum fractional distillation. The diepoxide was recovered as the fraction boiling 122–153° C./5 mm. Hg pressure. The forerun contained 5% diepoxide and 3% monoepoxide which may be recovered by a recycling process.

The foregoing examples illustrate a method of preparing bis-cyclopentenyl ether diepoxide. Polymers may be prepared from this material as aforementioned using $BF_3$ catalyst. The following example will illustrate the method of preparation.

EXAMPLE III

Into a 3-necked flask equipped with a stirrer, reflux condenser and addition funnel was placed 6 grams (0.03 mole) of bis-cyclopentenyl ether diepoxide and 25 ml. of a solution of 0.1 g. of $BF_3$ and 1 ml. of butanol in 50 ml. of toluene chilled to 0° C. The mixing of the contents of the reaction vessel caused the temperature to rise in the exothermic reaction to 20° C. where it was maintained for four hours of stirring. At the end of this time fuller's earth was added to neutralize the $BF_3$, and the resin solution recovered as filtrate. Toluene solvent was removed by vacuum distillation and the resinous product dried under vacuum. The product was a solid resin which softened at about 300° C. but did not melt. The resin was insoluble in mineral spirits, acetone, isopropyl ether, and isobutyl methyl ketone. The resin was soluble in toluene, chloroform, methyl Cellosolve and butyl Carbitol.

If desired, the product of the present invention can be polymerized with other catalysts similar to $BF_3$, such as $AlCl_3$ $ZnCl_2$, HF, hydrofluoric acid treated clay and the like.

The present composition can also be used to prepare copolymeric materials using other epoxides. For example, a copolymer having unusual physical properties has been prepared by using equimolar quantities of bis-cyclopentenyl ether diepoxide and propylene oxide as reactants and $BF_3$ in toluene as catalyst. Other epoxides such as ethylene oxide, styrene oxide, propylene oxide, vinyl cyclohexene oxide, butylene oxide, and the like can also be utilized to prepare a variety of useful copolymers which have the moiety of the present composition as a common characteristic reacted therein.

I claim:

As a new composition of matter a compound of the structure

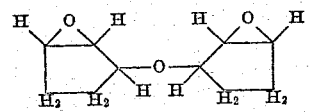

References Cited in the file of this patent

UNITED STATES PATENTS 2,543,419    Niederhauser _____ Feb. 27, 1951